(12) United States Patent
Kakizaki et al.

(10) Patent No.: US 6,229,883 B1
(45) Date of Patent: *May 8, 2001

(54) APPARATUS FOR PROVIDING CALLER ID SERVICES IN INTERNET TELEPHONY SYSTEM

(75) Inventors: Naoyuki Kakizaki; Katsuhisa Sato, both of Yokohama (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/102,497

(22) Filed: Jun. 22, 1998

(30) Foreign Application Priority Data

Jan. 20, 1998 (JP) .................................................. 10-008261

(51) Int. Cl.[7] .................................................. H04M 11/00
(52) U.S. Cl. ........................................ 379/93.23; 379/142
(58) Field of Search ........................... 379/93.23, 93.17, 379/90.01, 93.01, 93.05–93.08, 142, 136, 199, 379

(56) References Cited

U.S. PATENT DOCUMENTS 5,608,786 * 3/1997 Gordon ............................ 379/100.08
5,724,412 * 3/1998 Srinivasan ......................... 379/93.23
5,805,587 * 9/1998 Norris et al. ...................... 379/93.35
5,946,381 * 8/1999 Danne et al. ...................... 379/142
6,014,687    1/2000 Watanabe et al. .

FOREIGN PATENT DOCUMENTS

| 0 781 016 A2 | 11/1996 | (EP) . |
| 2-216954 | 8/1990 | (JP) . |
| 9-168033 | 6/1997 | (JP) . |
| 9-168051 | 6/1997 | (JP) . |

* cited by examiner

Primary Examiner—Wing F. Chan
(74) Attorney, Agent, or Firm—Helfgott & Karas, P.C.

(57) ABSTRACT

A system for delivering a caller's phone number to a called subscriber in an Internet telephony system. A calling subscriber (caller) first makes a call to its local server (caller-side server) to request an Internet-based call connection to a remote subscriber (callee). A first transmission unit, disposed in a caller-side local switch, transmits the caller's phone number to the caller-side server through a first control channel. A second transmission unit disposed in the caller-side server then transmits, over the Internet, the caller's phone number to another server (caller-side server) that is local to the callee. The caller's phone number is now available in the callee-side server. A caller number acquisition unit, disposed in the callee-side local switch, makes access to that information by using a second control channel. In this way, the callee-side local switch obtains the phone number of the caller.

22 Claims, 13 Drawing Sheets

FIND A RECORD BY USING SUBSCRIBER LINE INTERFACE POINT AS INDEX VALUE

SEARCH FOR AN UNUSED PORT

FIG. 5 (A)

15h SERVER MANAGEMENT DATA FILE

| SERVER ID NUMBER | |
|---|---|
| IP ADDRESS | |
| PORT ID NUMBER | SUBSCRIBER LINE INTERFACE POINT |
| PORT ID NUMBER | SUBSCRIBER LINE INTERFACE POINT |
| ⋮ | ⋮ |
| TRANSMISSION CHANNEL USAGE RECORD | |
| RECEPTION CHANNEL USAGE RECORD | |

FIG. 5 (B)

15g CALL CONTROL DATA FILE

| SUBSCRIBER LINE INTERFACE POINT | CALLER'S PHONE NUMBER |
|---|---|
| SUBSCRIBER LINE INTERFACE POINT | CALLEE'S PHONE NUMBER |
| ⋮ | |
| ⋮ | |
| ⋮ | |

APPARATUS FOR PROVIDING CALLER ID SERVICES IN INTERNET TELEPHONY SYSTEM

BACKGROUND OF THE INVENTION

1. Field of the Invention

The present invention relates to a system for providing caller ID services in an Internet telephony system, and more particularly to a system for providing caller ID services in an Internet telephony system which is organized by a telephone exchange and an Internet service provider's server on the side of a caller, the same on the side of a callee, and the Internet connecting between the caller-side server and the caller-side server.

2. Description of the Related Art

Recently, there has been a growing interest in telecommunications services using the Internet as a medium for real-time voice communication, since this technology promises a great reduction in the costs of long-distance telephone communications, including international calls. While several types of Internet-based telephony systems are available today, the following discussion will focus on a system having a specific structure shown in FIG. 12.

FIG. 12 is a total block diagram of a conventional system for Internet telephony services. In this system, two groups of subscriber terminals can communicate with each other, through their respective local telephone exchange systems (or local switches) and appropriate servers deployed by an Internet service provider (ISP). More specifically, the left-hand side of FIG. 12 shows the caller-side subsystem including a caller's telephone terminal 101, a telephone exchange 102, and an Internet service provider's server (hereafter, "ISP server" or "server") 103. Likewise, the right-hand side shows the callee-side subsystem including a callee's telephone terminal 107, a telephone exchange 106, and an ISP server 105. The Internet 104 is used for long distance transmission between the two servers 103 and 105. Telecommunications systems of this kind are expected to find widespread market acceptance, since they extend the benefits of Internet telephony to the users of plain old subscriber equipment.

FIG. 13 is a sequence diagram showing a procedure of connection establishment in the Internet telephony system of FIG. 12. Specifically, it depicts a situation where the telephone terminal 101 is attempting a call to the telephone terminal 107. The following paragraphs will explain the steps of this procedure, with reference to the sequence numbers (S101–S107) shown in FIG. 12.

The calling subscriber, or the caller, first dials the phone number of the server 103, which makes the telephone exchange 102 establish a connection path from his/her telephone terminal 101 to the server 103 (Step S101). To ensure that the caller is an authorized user of the Internet telephony service, the server 103 executes an authentication process, requesting the caller to enter his/her service account number and registered password (Step S102).

When the caller's authenticity is confirmed, the caller sends the callee's phone number (i.e., the number assigned to the telephone terminal 107) from the telephone terminal 101 to the server 103 (Step S103). In response to this, the server 103 searches for a telephone exchange that is linked to the callee's telephone terminal 107, and if a relevant telephone exchange is found, it further searches for an ISP server that is linked to that telephone exchange. In the present example, the server 103 identifies the server 105 as appropriate. The server 103 then sends a call reception request to the server 105 via the Internet 104 (Step S104). This call reception request contains the phone number of the callee.

Upon receipt of the request, the callee-side server 105 dials the phone number of the callee's telephone terminal 107, thereby establishing a connection path to the telephone terminal 107 (Step S105). When the connection between the two telephone terminals 101 and 107 is established, the system notifies the caller that he/she can now talk to the callee, through a voice guidance function or some other appropriate means (Step S106). The telephone terminals 101 and 107 start to communicate with each other over the Internet 104 (Step S107). During this session, the voice data is compressed by a codec for signal transmission with a reduced bandwidth usage.

Incidentally, conventional public switched telephone networks provide a service feature known as a "caller identification (ID)" service, which permits the recipient of an incoming call to determine, even before answering, the phone number from which the incoming call is being placed. To implement this feature, the caller-side local switch transmits, when processing a call request, the caller's phone number to the callee-side local switch through an inter-office trunk line (H2). The local switch on the callee's side delivers the received phone number information to the called subscriber. This caller ID service can be used in various applications, including such a service that tracks and locates a malicious caller who is threatening a subscriber.

However, the users of Internet telephony services cannot enjoy the above benefits of caller ID services. Because of the presence of the Internet 104 as an intermediate transmission medium between the telephone exchanges 102 and 106, an attempt of the callee-side telephone exchange 106 to identify the caller would end up with the phone number of the server 105, instead of that of the telephone terminal 101, which is what the telephone exchange 106 is really looking for.

As clarified above, the conventional Internet telephony systems are unable to provide users with caller ID services.

SUMMARY OF THE INVENTION

Taking the above into consideration, an object of the present invention is to provide a system for delivering a caller's phone number to an intended callee in an Internet telephony system.

To accomplish the above object, according to the present invention, there is provided a system for delivering a caller's phone number in an Internet telephony system. This system comprises: a caller-side local switch which is linked to a caller; a caller-side Internet service provider (ISP) server which is linked to the caller-side local switch; a callee-side local switch which is linked to a callee; a callee-side ISP server which is linked to the callee-side local switch; Internet which links between the caller-side ISP server and the callee-side ISP server; a first control channel which links between the caller-side ISP server and the caller-side local switch; a second control channel which links between the callee-side ISP server and the callee-side local switch; a first transmission unit, disposed in the caller-side local switch, for transmitting the caller's phone number to the caller-side ISP server through the first control channel; a second transmission unit, disposed in the caller-side ISP server, for receiving the caller's phone number from the first transmission unit and for transmitting the received caller's phone number to the callee-side ISP server over the Internet; and a caller number acquisition unit, disposed in the callee-side local switch, for acquiring the caller's phone number from the callee-side ISP server by using the second control channel.

Furthermore, to accomplish the above object, according to the present invention, there is provided another system for transmitting a caller's phone number in an Internet telephony system. This system comprises: a caller-side local switch which is linked to a caller; a caller-side Internet service provider (ISP) server which is linked to the caller-side local switch; a callee-side local switch which is linked to a callee; a callee-side ISP server which is linked to the callee-side local switch; Internet which links between the caller-side ISP server and the callee-side ISP server; a first control channel which links between the caller-side ISP server and the caller-side local switch; a second control channel which links between the callee-side ISP server and the callee-side local switch; a caller number acquisition unit, disposed in the caller-side ISP server, for acquiring the caller's phone number from the caller-side local switch by using the first control channel; a caller number transmission unit, disposed in the caller-side ISP server, for transmitting the caller's phone number to the callee-side ISP server over the Internet; and a caller number informing unit, disposed in the callee-side ISP server, for informing the callee-side local switch of the caller's phone number through the second control channel.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5(A) is a diagram which shows the structure of a server management data file;

FIG. 5(B) is a diagram which shows the structure of a call control data file;

DESCRIPTION OF THE PREFERRED EMBODIMENTS

An embodiment of the present invention will be described below with reference to the accompanying drawings.

Figure 1:
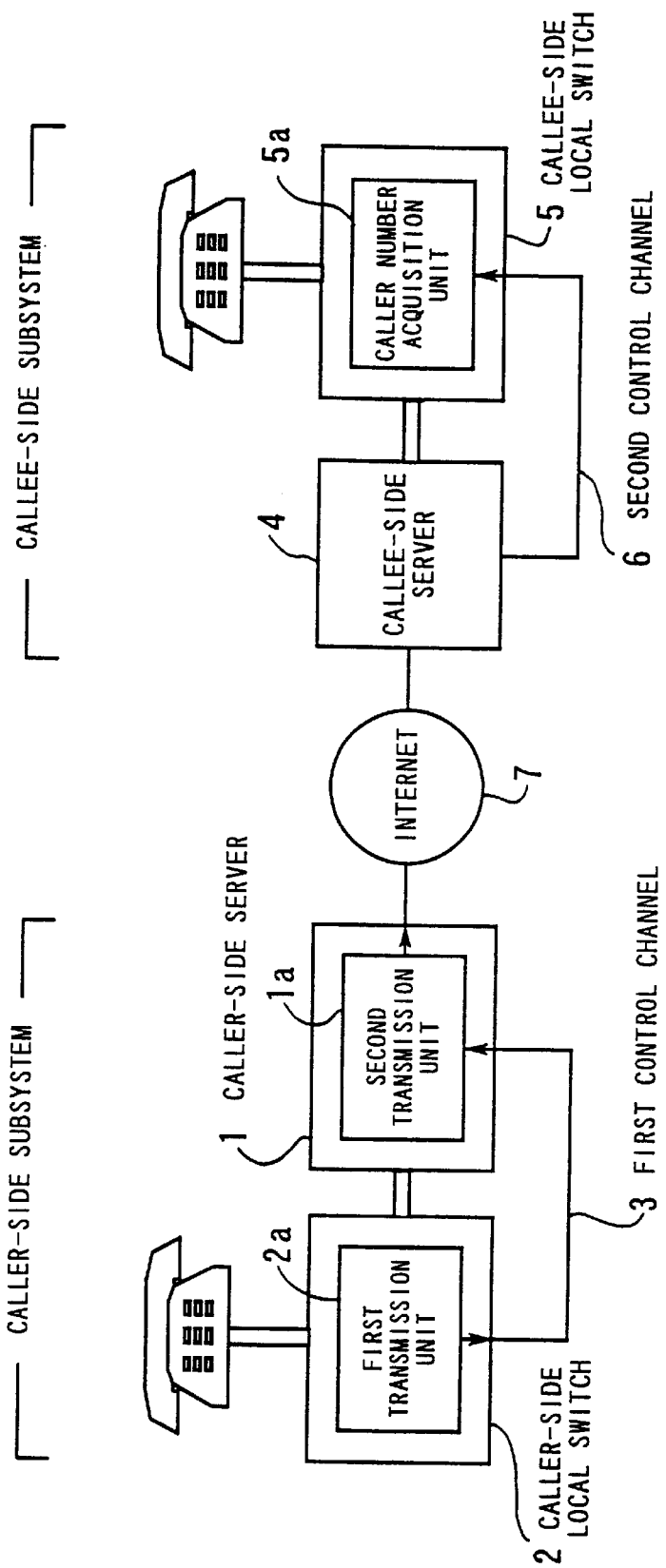
FIG. 1 is a conceptual view of the present invention.

Referring first to FIG. 1, the following will present the concept of an embodiment of the present invention. FIG. 1 illustrates an Internet telephony system that is configured to deliver caller ID information (i.e., a caller's phone number) to an intended callee. While the system is functionally symmetrical by nature (i.e., the messages can be transmitted in both directions), it is assumed, for illustrative purposes, that the caller resides on the left-hand side of FIG. 1 and the callee on the right-hand side.

This Internet telephony system of the present embodiment is organized by the following units:

a caller-side local switch 2 which is linked to the caller;

a caller-side server 1 which is linked to the caller-side local switch 2;

a callee-side local switch 5 which is linked to the callee;

a callee-side server 4 which is linked to the callee-side local switch 5; and the Internet 7 which links between the caller-side server 1 and the callee-side server 4.

In the present embodiment, the system comprises the following elements to provide a caller ID service:

a first control channel 3 which links between the caller-side server 1 and the caller-side local switch 2;

a second control channel 6 which links between the callee-side server 4 and the callee-side local switch 5;

a first transmission unit 2a, disposed in the caller-side local switch 2, which transmits the caller's phone number to the caller-side server 1 through the first control channel 3;

a second transmission unit 1a, disposed in the caller-side server 1, which receives the caller's phone number from the first transmission unit 2a, and transmits the received caller's phone number to the callee-side server 4 over the Internet 7; and a caller number acquisition unit 5a, disposed in the callee-side local switch 5, for acquiring the caller's phone number from the callee-side server 4 by using the second control channel 6.

In the above-described structural arrangement, the first control channel 3 and the second control channel 6, disposed separately from subscriber lines, are dedicated transmission channels to deliver a caller's phone number. Generally, local switches have a knowledge of the phone numbers of their local subscribers (but not of the remote subscribers). In the present system, the caller-side local switch 2 can identify the caller, and transmits its phone number information to the caller-side server 1 over the first control channel 3. This transmission is performed by the first transmission unit 2a in the caller-side local switch 2. Upon receipt of the caller's phone number, the second transmission unit 1a in the caller-side server 1 forwards it to the callee-side server 4 over the Internet 7. The caller number acquisition unit 5a in the callee-side local switch 5 makes access, through the second control channel 6, to the caller's phone number that is available in the callee-side server 4.

The callee-side local switch 5 can obtain the caller's phone number in this way. It is therefore possible for the local switch 5 to provide its local subscribers with caller ID services, as in the case of ordinary public switched telephone networks which do not involve the Internet.

The following section will now describe the embodiment of the present invention in more detail.

Figure 2:
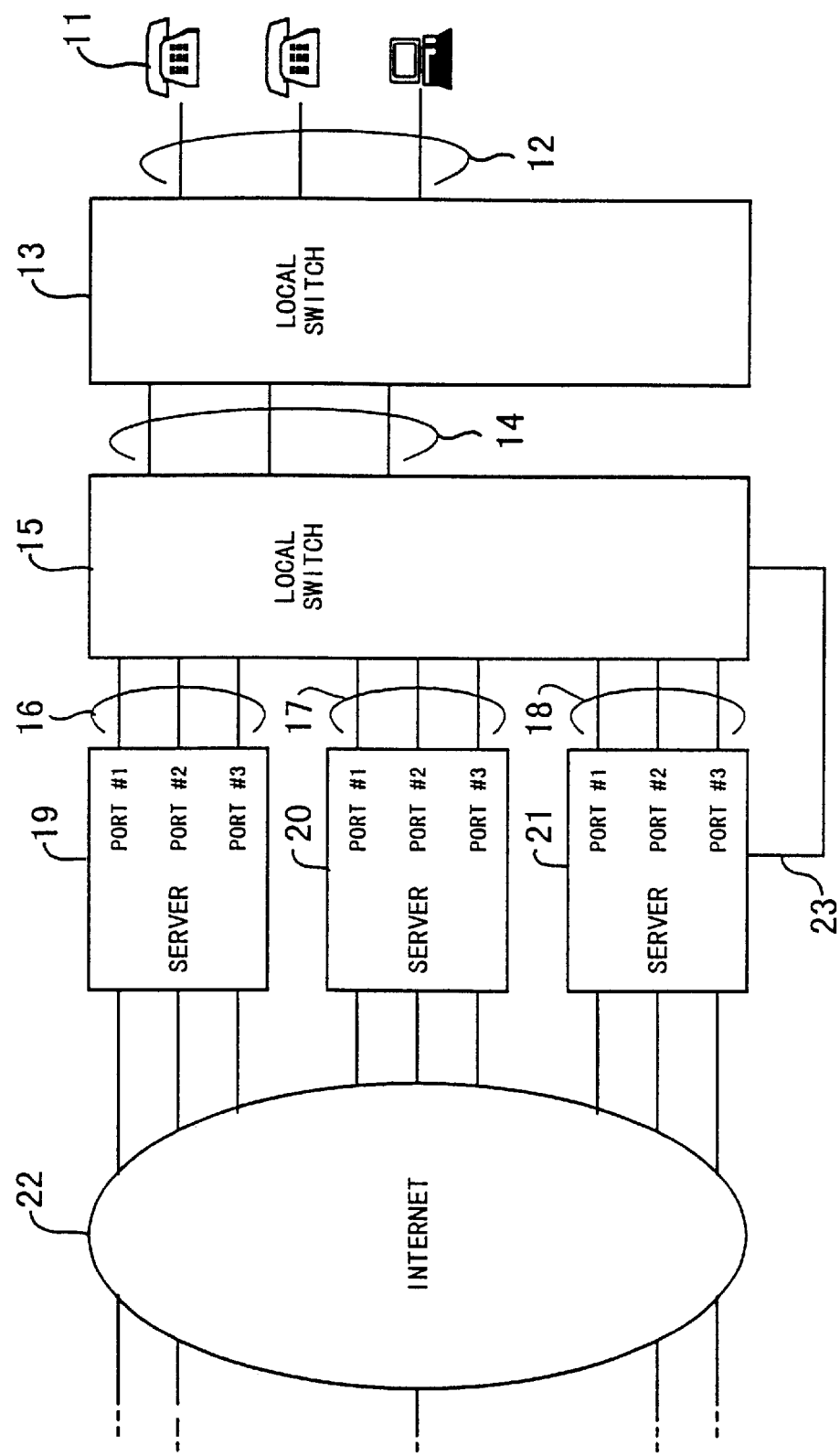
FIG. 2 is a diagram which shows a telecommunications network having links to the Internet.

FIG. 2 shows a telecommunications network having links to the Internet. Subscriber units, such as a telephone terminal 11, are linked to their local switch 13 through individual subscriber lines (H3) 12. The local switch 13 is connected to another local switch 15 through inter-office trunk lines (H2) 14. For Internet telephony services, Internet service providers deploy a plurality of servers 19 to 21, which are linked to the local switch 15 through their respective subscriber lines (H3) 16 to 18. Those servers 19 to 21 each operate as a gateway that connects a public switched telephone network (i.e., the right half of FIG. 2) with the Internet 22.

Although FIG. 2 illustrates only a portion of the present Internet telephony system, many such combinations of servers, local switches, and subscriber's telephone terminals are deployed in different places, being interconnected by the Internet 22 to provide services in a wide coverage area. Therefore, the following explanation will cite this subsystem of FIG. 2 as a caller-side subsystem, as well as a callee-side subsystem.

The illustrated system has a control channel (H1) 23, which is dedicated to the delivery of callers' phone numbers from the local switch 15 to the server 21, or vice versa. Namely, the control channel (H1) 23 acts as the first control channel 3 in FIG. 1 when FIG. 2 is supposed to represent the caller-side subsystem, while it also serves as the second control channel 6 in FIG. 1 when FIG. 2 is supposed to represent the caller-side subsystem.

Although only one such control channel is shown in FIG. 2, the system can be configured to have two or more control channels to link between the local switch 15 and the server 21. It is also possible for the system to employ more such channels to extend like linkage to other servers. The essential requirement in the present embodiment is that every local switch directly coupled to an ISP server(s) should have at least one control channel (H1) to reach the ISP server(s).

The server 19 is connected to the local switch 15 by a link containing a plurality of subscriber lines (H3) 16. Likewise, the other servers 17 and 18 are linked to the local switch 15 by dedicated subscriber lines 17 and 18. To distinguish these individual subscriber lines from each other, different port ID numbers (e.g., port #1 to port #3) are assigned to the connection points on the server side of the link. The connection points on the side of the local switch 15 are referred to as "subscriber line interface points." The local switch 15 manages the assignment of these "subscriber line interface points" in association with the port ID numbers on the server's side. The details of this will be found in a later section.

The local switch 15 communicates with the servers 19 to 21 via the control channel (H3) 23 by using Transmission Control Protocol/Internet Protocol (TCP/IP). To this end, the local switch 15 has a TCP/IP protocol controller 15d (described later), and the servers 19 to 21 are each equipped with a communication control unit to send and receive callers' phone number information. The servers 19 and 20, having no direct control channel to the local switch 15, send and receive such information to/from the local switch 15 via an indirect connection path formed by the Internet 22, the server 21, and the control channel (H1) 23.

The local switch 15 maintains a server management data file 15h, as will be described later, to record how many times the servers 19 to 21 have used the control channel (H1) 23 on an individual server basis. Based on this usage record of the control channel (H1) 23, the Internet service provider who owns the server 21 charges the other providers, or the owners of other servers 19 and 20, for their use of the control channel (H1) 23.

Figure 3:
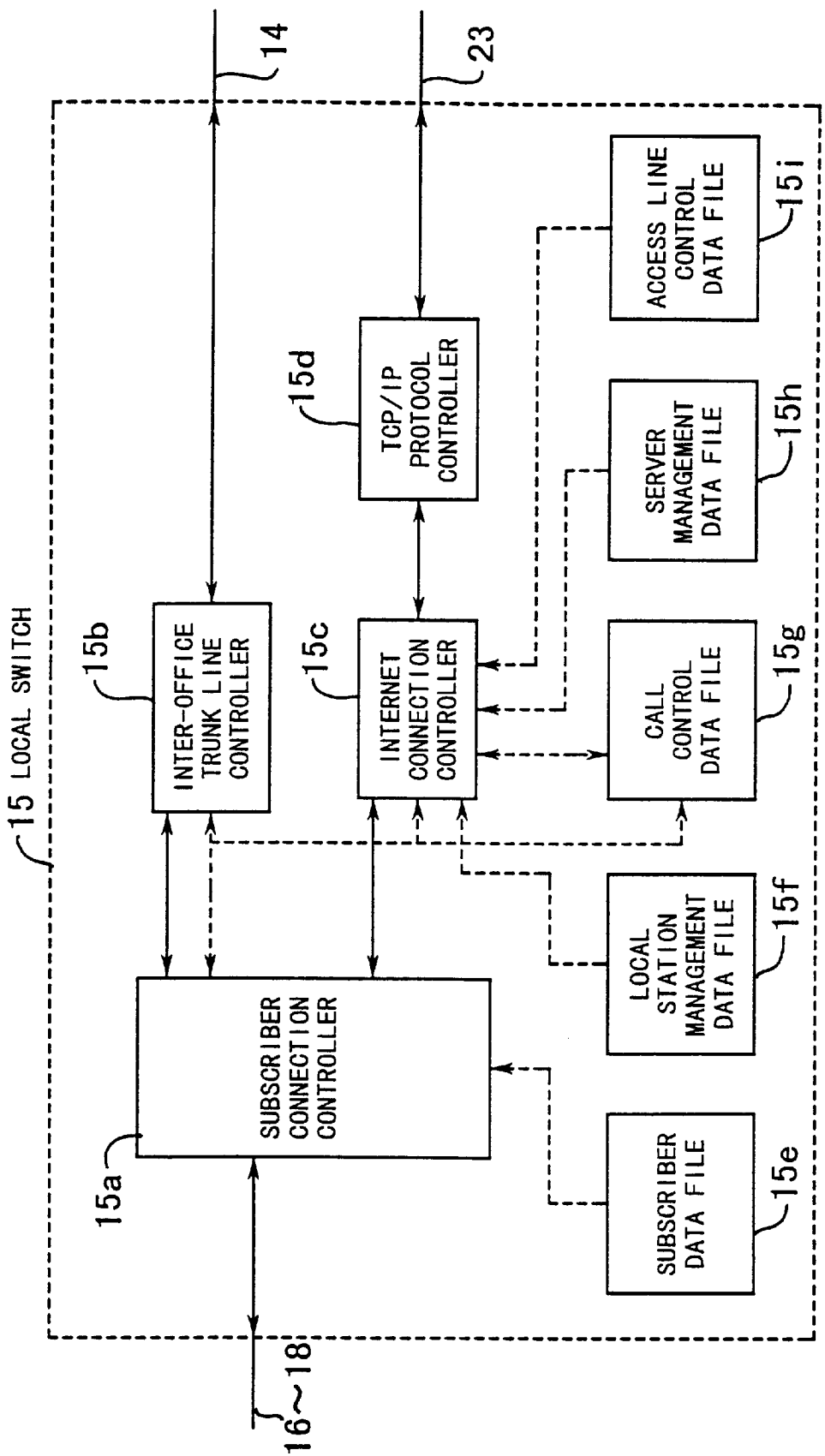
FIG. 3 is a diagram which shows the internal structure of a local switch.

FIG. 3 shows the internal structure of the local switch 15. Although FIG. 3 does not show it explicitly, the local switch 15 contains a data processing unit composed of a central processing unit (CPU), read-only memories (ROM), random access memories (RAM), and I/O interface devices. This data processing unit functions as a subscriber connection controller 15a, an inter-office trunk line controller 15b, an Internet connection controller 15c, and a TCP/IP protocol controller 15d. To achieve these functionalities, the data processing unit maintains a subscriber data file 15e, a local station management data file 15f, a call control data file 15g, a server management data file 15h, and an access line control data file 15i.

The above elements of the local switch 15 have the following correspondence to the elements shown in FIG. 1. That is, the Internet connection controller 15c and TCP/IP protocol controller 15d will operate as the first transmission unit 2a (FIG. 1), when the local switch 15 is deployed as the caller-side local switch 2. The Internet connection controller 15c and TCP/IP protocol controller 15d will function as the caller number acquisition unit 5a (FIG. 1), when the local switch 15 is deployed as the callee-side local switch 5. The details of these functional elements and their associated data files are described below.

The subscriber connection controller 15a processes network connection in response to a subscriber's request for the establishment and release of a call, as well as monitoring the status of each call in progress. The inter-office trunk line controller 15b is responsible for the connection control and status monitoring for the inter-office trunk lines 14. It supports traditional telephone exchange processes on the basis of various signaling systems, such as No. 7, DP, and MFC.

The Internet connection controller 15c, a unique feature of the present invention, provides the following two functions. First, when the local switch 15 is operating as a callee-side local switch, the Internet connection controller 15c requests an appropriate ISP server to deliver the caller's phone number. Second, when the local switch 15 is operating as a caller-side local switch, the Internet connection controller 15c transmits the caller's phone number to the requesting ISP server. The TCP/IP protocol controller 15d is another unique feature of the present invention, which supports the TCP/IP protocols to link the Internet connection controller 15c with the servers 19 to 21 via the control channel (H1) 23.

Figure 4:
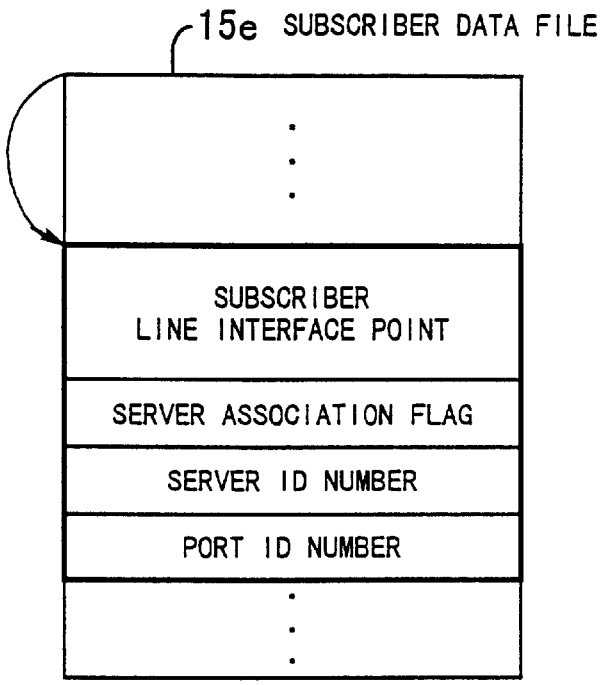
FIG. 4(A) is a diagram which shows the structure of a subscriber data file.
FIG. 4(B) is a diagram which shows the structure of an access line control data file.
FIG. 4(C) is a diagram which shows the structure of a local station management data file.
Figure 4:
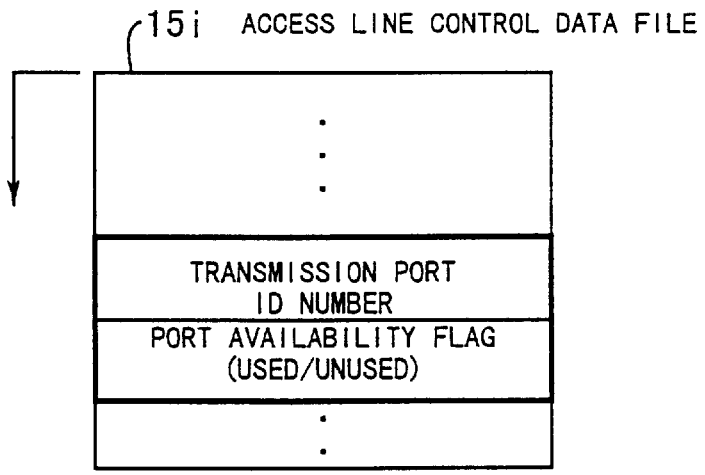
Figure 4:
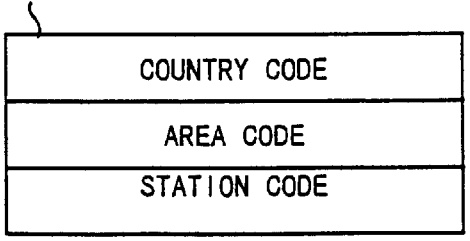

Referring next to FIGS. 4 and 5, the following section will describe the structure of the subscriber data file 15e, the local station management data file 15f, the call control data file 15g, the server management data file 15h, and the access line control data file 15i.

FIG. 4(A) shows the structure of the subscriber data file 15e. This subscriber data file 15e describes all subscribers that the local switch 15 accommodates, whose data records are arranged on the basis on the aforementioned "subscriber line interface points." Here, the term "subscriber line interface point" indicates a specific portion of a local switch to which a subscriber line (H3) is accommodated, which is actually represented by a combination of a shelf ID number, a card ID number, and a circuit ID number, thus allowing different subscriber lines to be uniquely identified. In the present embodiment, where the local switch 15 is linked to the servers 19 to 21 as shown in FIG. 2, each subscriber line interface point has a one-to-one relationship with a specific port on a server, and that port can be uniquely identified by a combination of identification numbers of a server and a port used within the server. According to the present invention, the subscriber data file 15e is formulated to represent the above relationships, and each record will thus contain the following data items: a subscriber line interface point, a server association flag indicating whether the subscriber is association with any server, a server ID number to identify a specific server, and a port ID number to identify a specific port of the server (if the subscriber is associated with it). The subscriber connection controller 15a, when searching this file, can reach the desired record by using its subscriber line interface point as an index value.

FIG. 4(B) shows the structure of the access line control data file 15i. When a local switch has a plurality of control channels (H1) to reach servers, the local switch distinguishes the channels by transmission port ID numbers that are assigned to them. For each control channel (H1), the access line control data file 15i contains a port availability flag to show whether the control channel is currently used.

FIG. 4(C) shows the data structure of the local station management data file 15f. The local station management data file 15f contains phone number information corresponding to the location where the local switch 15 is based. This information includes the following items: a country code, an area code, and a station code (or local exchange number).

FIG. 5(A) shows the structure of the server management data file 15h. This server management data file 15h consists of a plurality of records corresponding to individual servers. Each record contains a server ID number and an IP address assigned to the server, and in addition, the relationships between port ID numbers and subscriber line interface points, for all ports that the server owns. Furthermore, each record maintains the number of times that the server has used the control channel (H1) 23 to exchange caller ID signals, separately for transmitting and receiving operations. This channel usage information is shown in FIG. 5(A) as the data fields named "Transmission Channel Usage Record" and "Reception Channel Usage Record."

FIG. 5(B) shows the data structure of the call control data file 15g. This call control data file 15g shows a log of call connections, each time the local switch 15 processes an outgoing or incoming call. More specifically, it stores the phone number of the caller or callee into this call control data file 15g, together with its associated subscriber line interface point.

Now, the following section will explain a process executed by the above-described local switches and servers to provide Internet telephony services. Particularly, the explanation focuses on a connection establishment sequence between a caller's telephone terminal and a callee's telephone terminal, as well as a process of informing the callee-side local switch of the caller's phone number.

Figure 6:
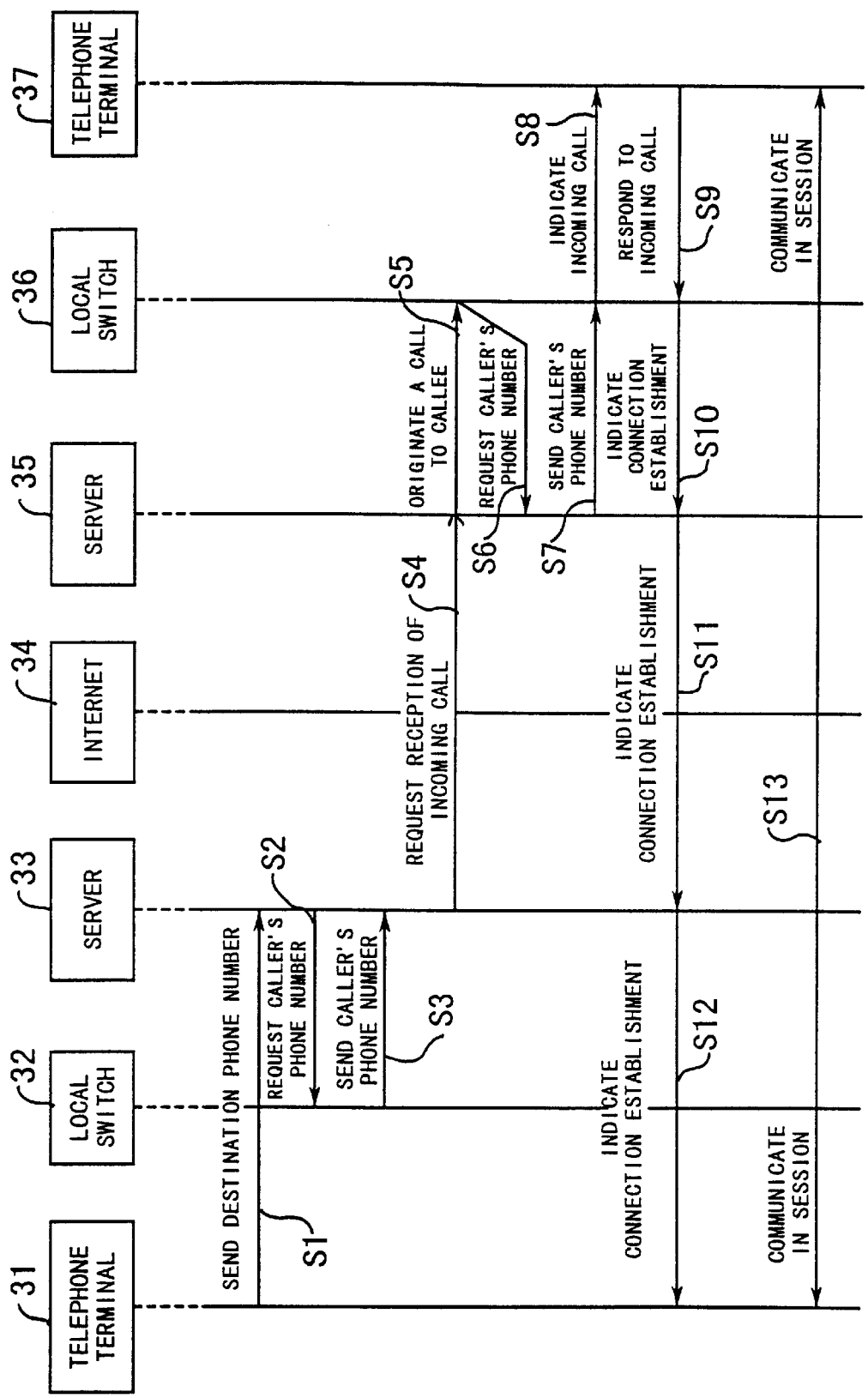
FIG. 6 is a sequence diagram which shows a process of setting up a connection between a caller's telephone terminal and a callee's telephone terminal via the Internet and notifying the callee-side local switch of the caller's phone number.

FIG. 6 shows the entire sequence of a connection establishment process between a caller and a callee over the Internet and a subsequent notification process of the caller's phone number to the callee-side local switch. This process involves, as the entities on the caller's side, a telephone terminal 31, a local switch 32, and a server 33. It further involves a server 35, a local switch 36, and a telephone terminal 37, as the entities on the callee's side. Here, the two servers 33 and 35 can communicate over the Internet 34, and the local switches 32 and 36 have the internal structure explained in FIGS. 3 to 5. These entities in FIG. 6 have the following functional correspondence to the elements shown in the conceptual view of FIG. 1: the caller-side server 1 and second transmission unit 1a to the server 33, the caller-side local switch 2 to the local switch 32, the callee-side server 4 to the server 35, and the callee-side local switch 5 to the local switch 36.

Suppose here that a call is attempted from the caller-side telephone terminal 31 to the callee-side telephone terminal 37. This first causes a call connection sequence between the telephone terminal 31 and the caller-side server 33, as well as invoking a caller authentication procedure, just in the same way as the conventional process steps S101 and S102 of FIG. 13. Note that FIG. 6 omits the steps equivalent to S101 and S102 and focuses on the later part of the sequence. The following will describe the detailed operations, citing the relevant sequence numbers (S1 to S13) indicated in FIG. 6.

When a caller-side connection between the telephone terminal 31 and the server 33 is established, and if a subsequent caller authentication process is successfully completed, the telephone terminal 31 then notifies the server 33 of the phone number of the intended destination (i.e., the callee) (Step S1). Upon reception of the callee's phone number, the server 33 requests the local switch 32, through a control channel (H1), to supply the caller's phone number (Step S2). The local switch 32 responds to this request from the server 33 by searching the call control data file 15g (FIG. 5(B)) and transferring the retrieved caller's phone number to the server 33 over the control channel (H1) (Step S3). Note that these two steps S2 and S3 are not present in the conventional sequence, but newly added in the present invention. The details will be described later, with reference to FIGS. 7 and 8.

After that, the caller-side server 33 sends a call reception request to the callee-side server 35 via the Internet 34 (Step S4), which initiates the transmission of a call origination request from the server 35 to its associated local switch 36 through a subscriber line (H3) (Step S5). Although these two steps S4 and S5 operate similarly to the conventional steps S104 and S105 of FIG. 13, it should be noted that the server 33 in the present invention delivers the caller's phone number to the server 35 as part of the call reception request.

Upon reception of the call origination request, the local switch 36 requests the server 35, through the control channel (H1), to supply the caller's phone number (Step S6). The server 35 then sends the caller's phone number to the local switch 36 via the control channel (H1) (Step S7). These two steps S6 and S7 are not present in the conventional sequence, but newly added in the present invention. The details will be described later, with reference to FIGS. 9 to 11.

Figure 13:
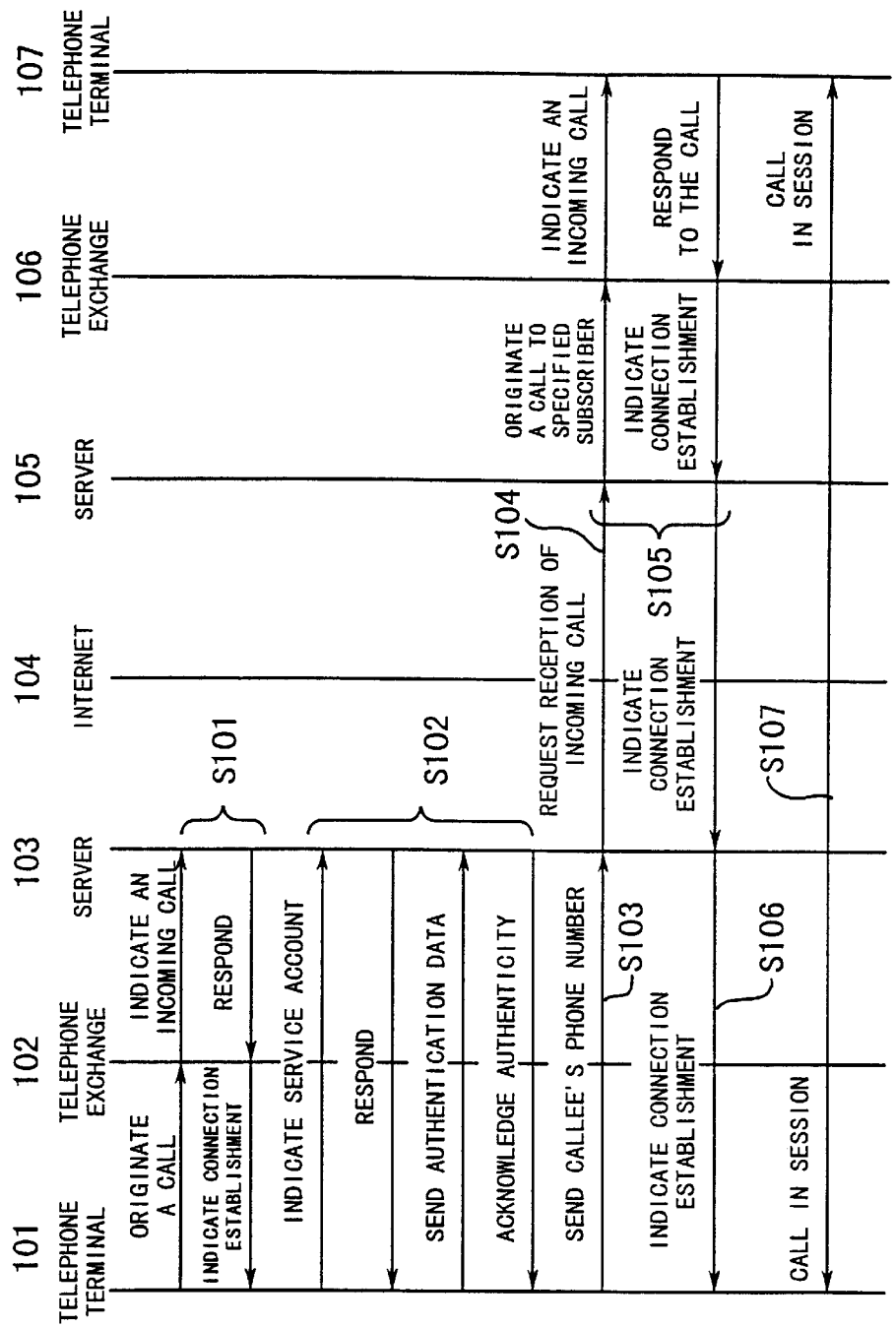
FIG. 13 is a sequence diagram which shows a call set up process executed by the conventional Internet telephony system of FIG. 12 to establish a connection between two remote telephone terminals.

The later steps S8 to S13 are identical to the conventional steps S105 and S107 of FIG. 13 (see earlier section for their description).

Figure 7:
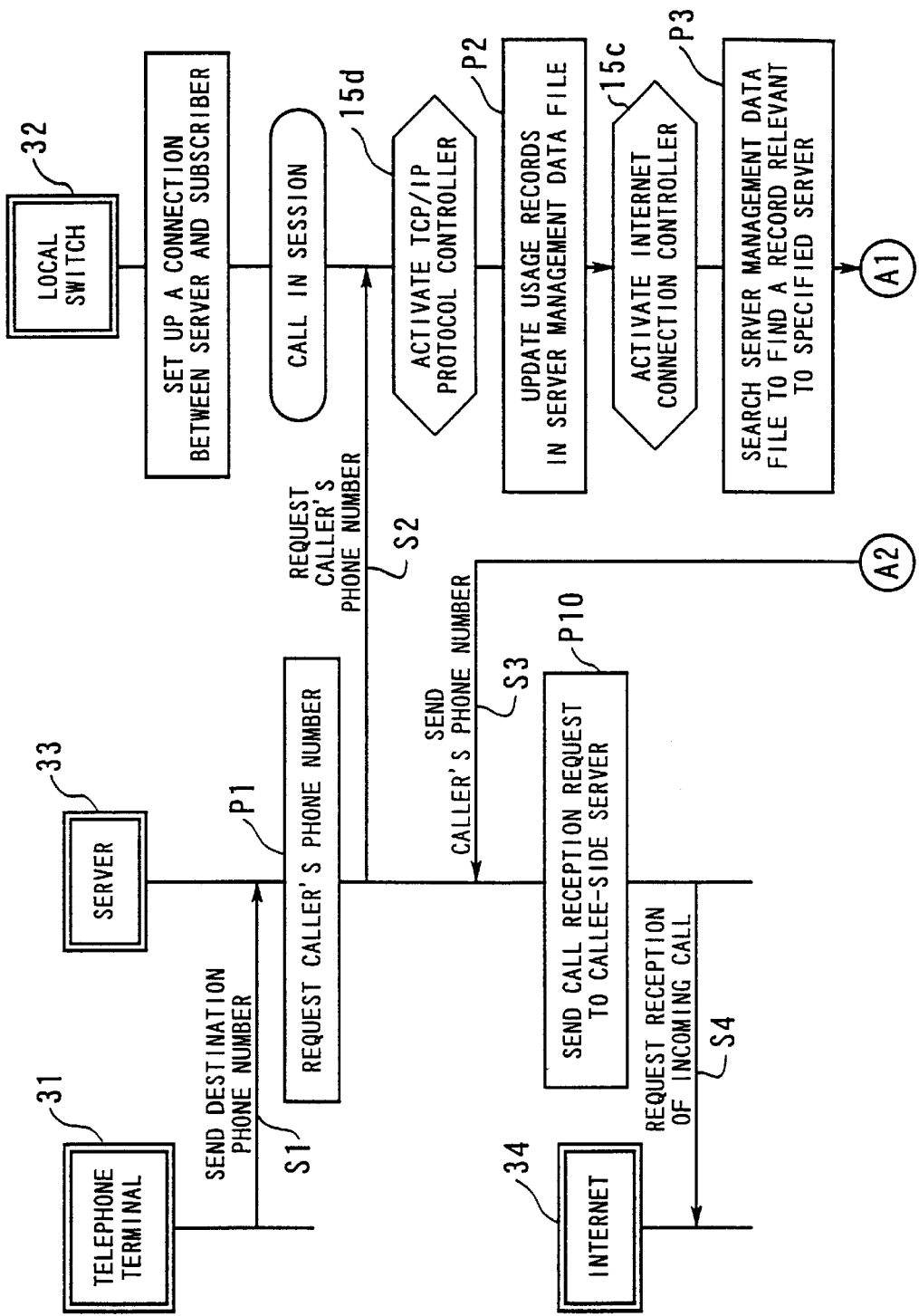
FIGS. 7 and 8 are the first and second halves of a sequence diagram which show the details of steps S2 and S3 in FIG. 6, along with some additional descriptions about how the involved entities operate in these steps.
Figure 8:
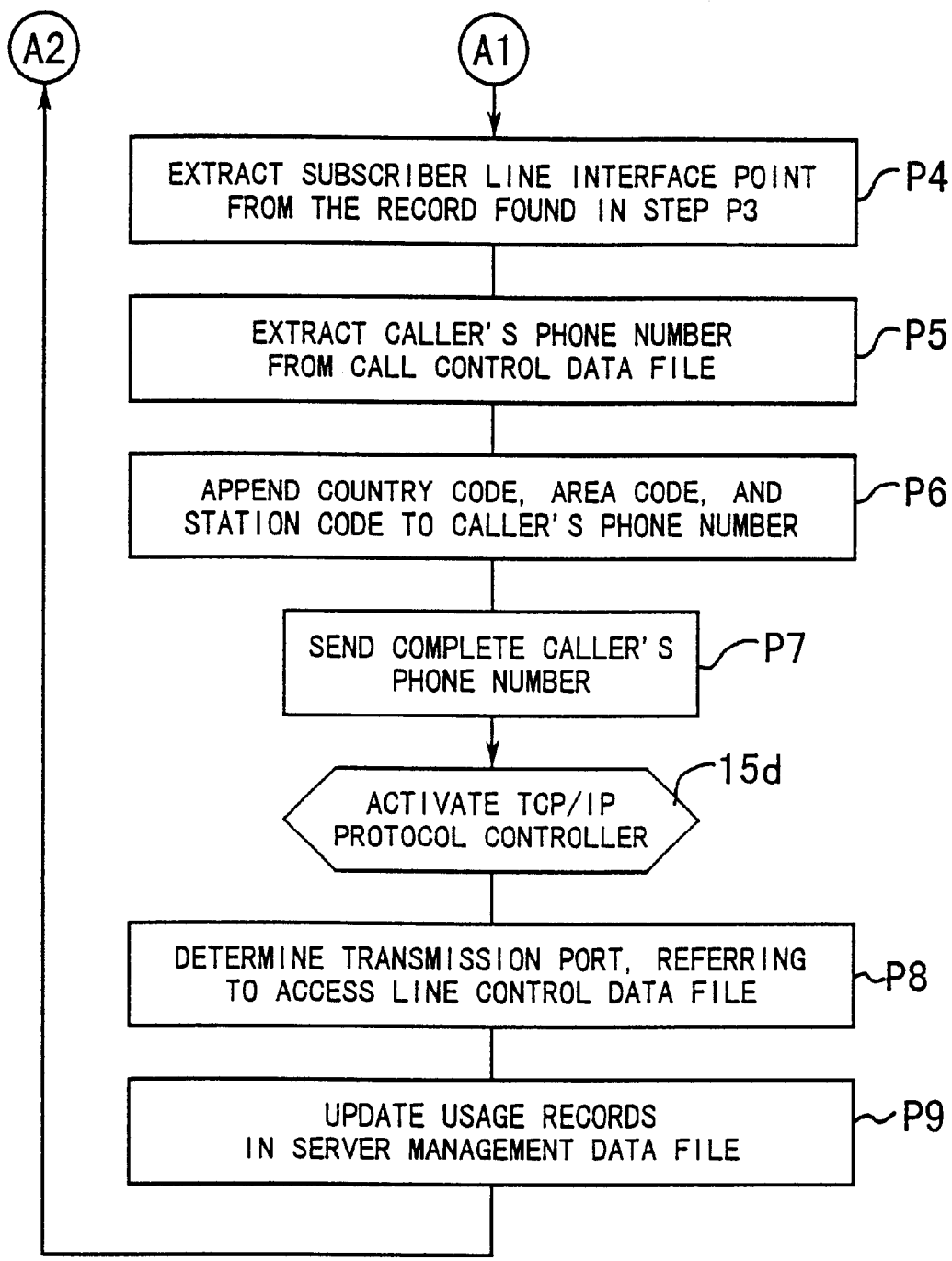

Referring now to FIGS. 7 and 8, the details of the process steps S2 and S3 of FIG. 6 will be described below, including the additional information on how the involved entities play their respective roles in these steps. The following will explain the process flow, with reference to the step numbers (P1 to P9) indicated in FIGS. 7 and 8.

The server 33, upon receipt of the callee's phone number (Step S1), sends a request for the caller's phone number to the local switch 32 through a control channel (H1) (Steps P1, S2). Along with this request, the server 33 sends its own IP address and the port ID number of the line being used to interact with the caller's telephone terminal 31.

In response to this request, the caller-side local switch 32 first activates its TCP/IP protocol controller 15d to update the reception channel usage record in the server management data file 15*h* (see FIG. 5(A)) (Step P2). More specifically, the TCP/IP protocol controller 15*d* retrieves a record from the server management data file 15*h*, using the received IP address as a search keyword. When the relevant record is found, the TCP/IP protocol controller 15*d* increments the value of its "Reception Channel Usage Record" field by one.

The local switch 32 then activates its integral Internet connection controller 15*c* to search the server management data file 15*h* again to find a record corresponding to the received IP address (Step P3). When the relevant record is found, the Internet connection controller 15*c* extracts a specific subscriber line interface point from the record by using the received port ID number as an index value(Step P4). The extracted "subscriber line interface point" indicates the end point, on the local switch 32's side, of a subscriber line (H3) that is now linking the local switch 32 with the server 33.

Consulting next the call control data file 15*g* (FIG. 5(B)), the Internet connection controller 15*c* obtains a phone number corresponding to the subscriber line interface point extracted above. This is the phone number of the present caller (Step P5). The Internet connection controller 15*c* then retrieves a country code, area code, and station code (local exchange number) from the local station management data file 15*f* (see FIG. 4(C)), and appends these codes to the caller's phone number as its preceding digits (Step P6). This fully supports the recipient of an international call who may wish to identify the party calling from a foreign country. Now that the complete phone number information is ready, the Internet connection controller 15*c* requests the TCP/IP protocol controller 15*d* to deliver the information to the server 33 on the callee's side (Step P7).

In response to this, the TCP/IP protocol controller 15*d* tries to find a vacant transmission port to make access to a control channel, by searching the access line control data file 15*i* (see FIG. 4(B)) (Step P8). Recall here that the local switch 32 can have a plurality of control channels (H1). If this is the case, the TCP/IP protocol controller 15*d* opens the access line control data file 15*i* and detects an unused control channel (H1) by searching through the contents of each record's "port availability flag" field. If there is a record indicative of the vacancy of a transmission port, the TCP/IP protocol controller 15*d* extracts the corresponding transmission port ID number from the record found.

The TCP/IP protocol controller 15*d* now updates the transmission channel usage record in the server management data file 15*h* (Step P9). More specifically, the TCP/IP protocol controller 15*d* retrieves a record pertaining to the server 33 from the server management data file 15*h*, and increments the value of its "transmission channel usage record" field by one. The TCP/IP protocol controller 15*d* finally transmits the caller's phone number information obtained in step P6 to the server 33 through the control channel (H1) determined in step P8 (Step S3).

Upon receipt of the caller's phone number, the caller-side server 33 transmits a call reception request to the callee-side server 35 via the Internet 34. This request message contains both caller's and callee's phone numbers (Steps P10 and S4).

Figure 9:
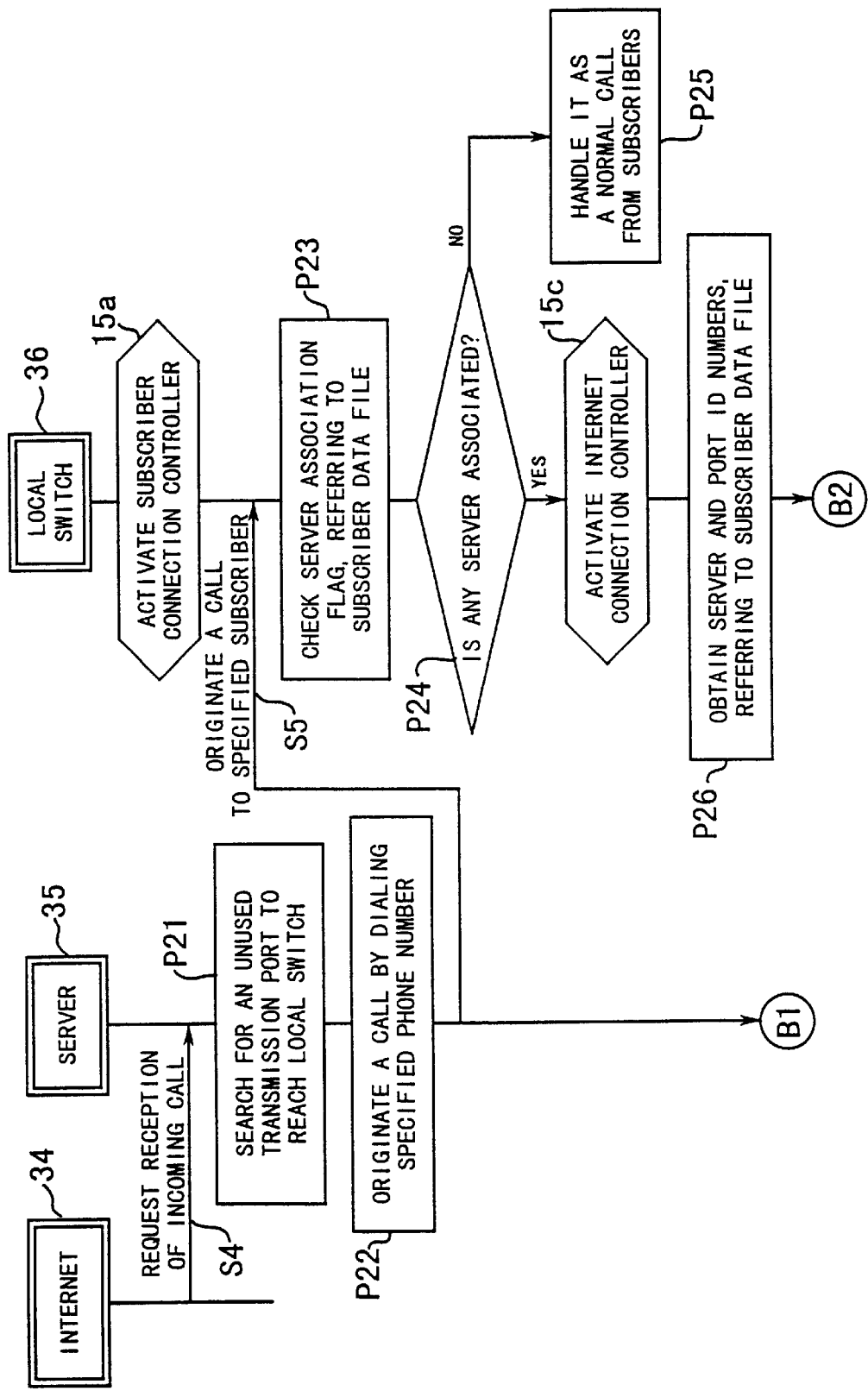
FIGS. 9 to 11 are the first to third sections of a sequence diagram which show the details of steps S6 and S7 in FIG. 6, along with some additional descriptions about how the involved entities operate in these steps.
Figure 10:
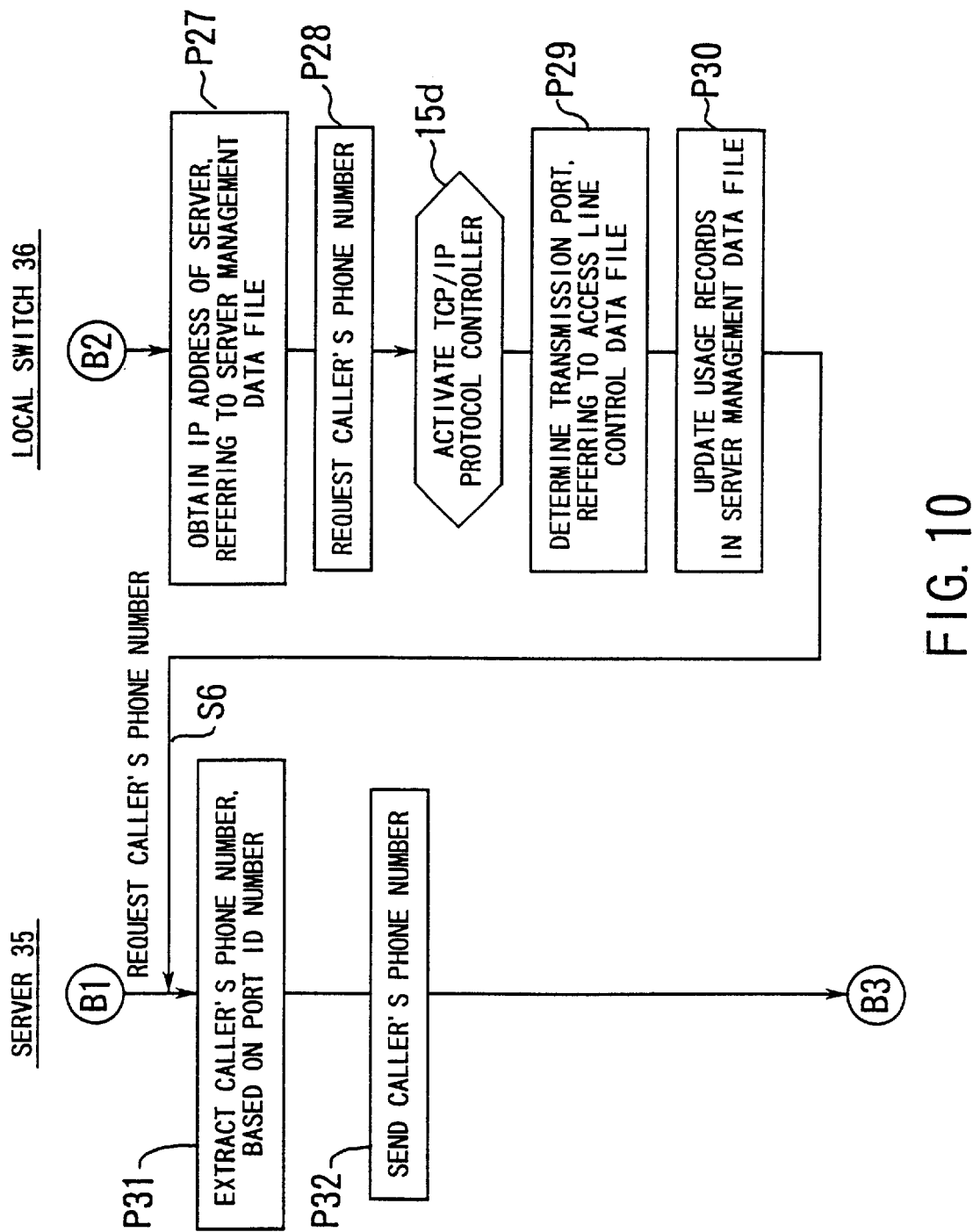
Figure 11:
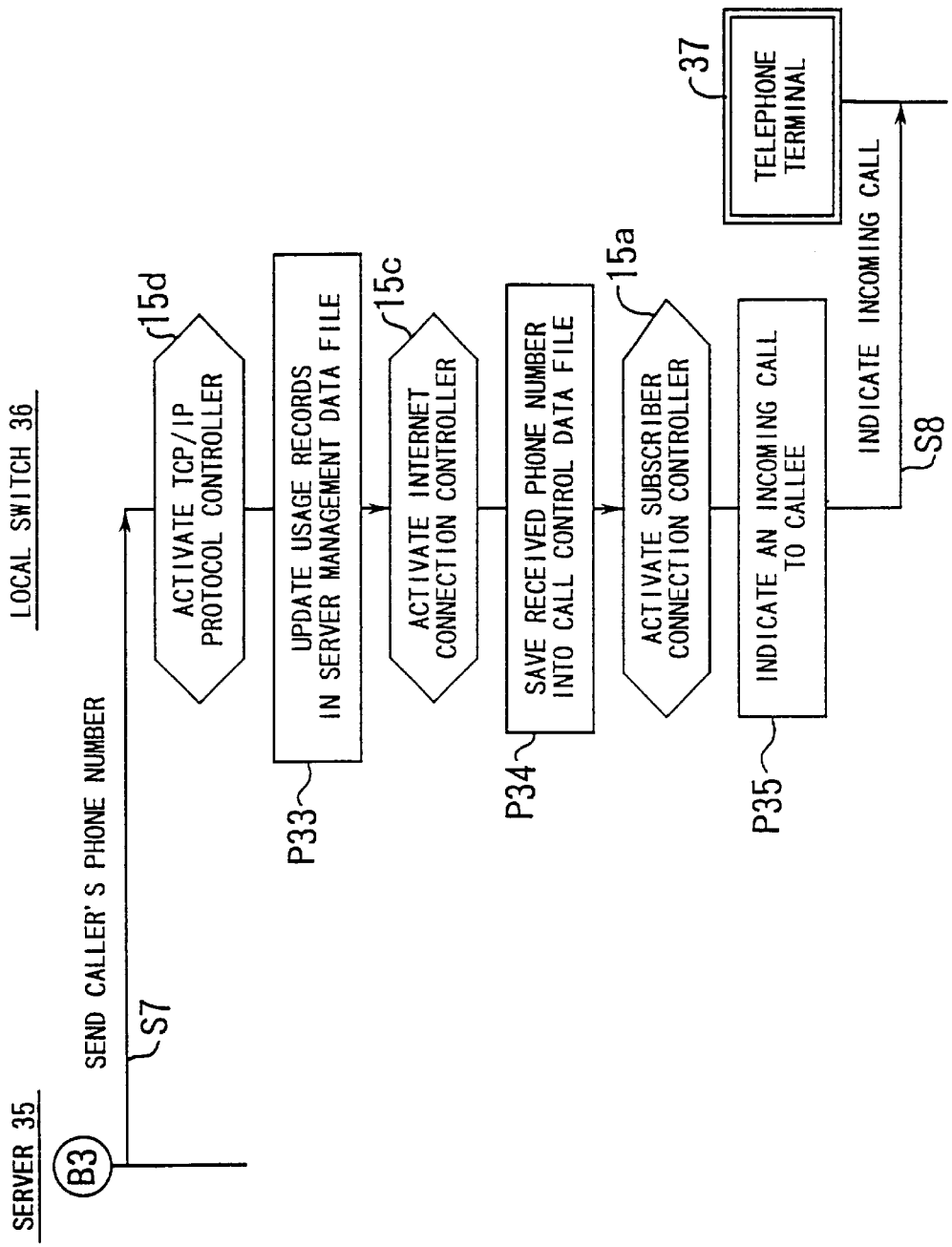
Figure 12:
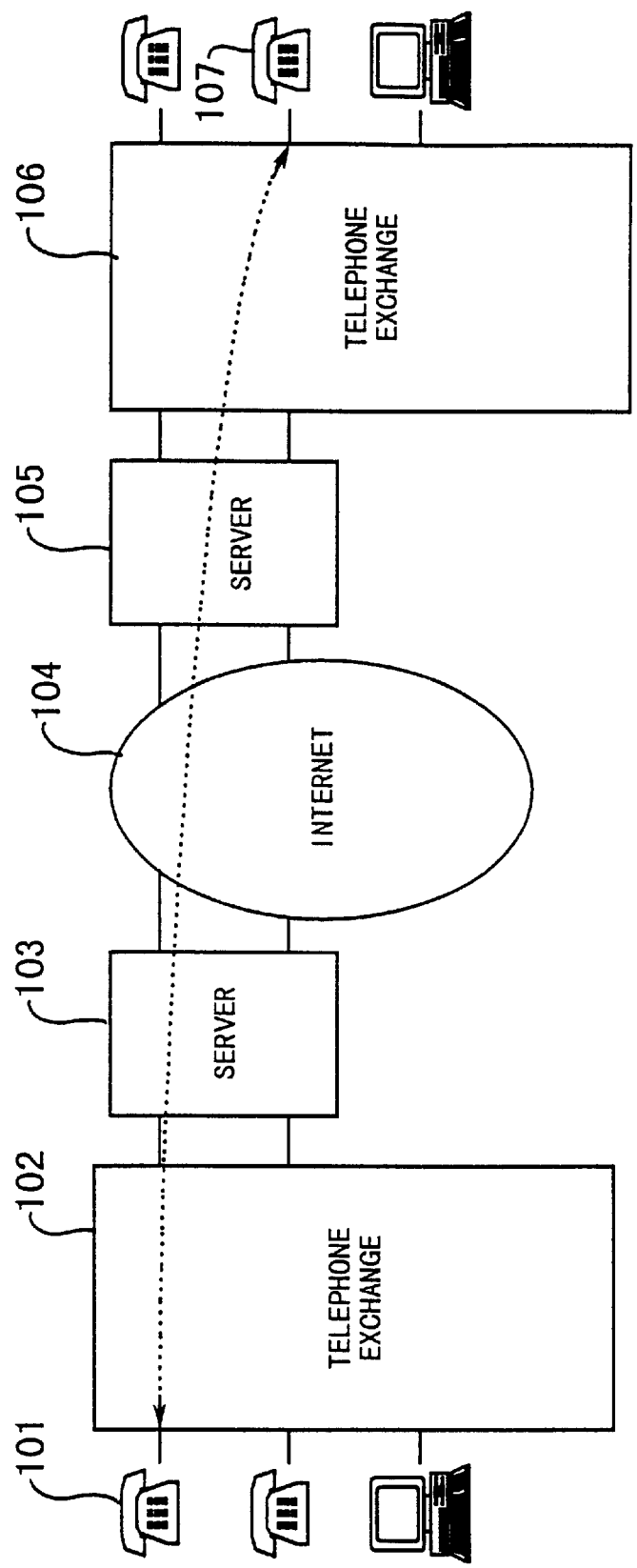
FIG. 12 is a total block diagram which shows a typical configuration of a conventional Internet telephony system.

FIGS. 9 to 11 provide the details of the callee-side process steps S6 and S7 of FIG. 6, including the additional information on how the involved entities play their respective roles in these steps. The following will explain the process flow of FIGS. 9 to 11, with reference to the step numbers (P21 to P35) shown in them.

When a call reception request is received through the Internet 34 (Step S4), the callee-side server 35 searches for an unused subscriber line (H3) to reach the local switch 36 and obtains its port ID number (Step P21). With the subscriber line (H3) having this port ID number, the server 35 transmits a call origination request to the local switch 36, dialing the phone number of the intended callee (Steps P22 and S5).

Upon receipt of this call origination request, the local switch 36 activates its own subscriber connection controller 15*a*. Searching the subscriber data file 15*e* (see FIG. 4(A)), the subscriber connection controller 15*a* determines whether the request is from one of the servers or from any other subscriber terminals (Step P23 and P24). More specifically, the subscriber connection controller 15*a* first determines which subscriber line (H3) is now signaling the call origination request, thereby identifying its subscriber line interface point. Using this subscriber line interface point as an index value, the subscriber connection controller 15*a* extracts the relevant subscriber's record out of the subscriber data file 15*e*. It then determines whether any server is assigned to the called subscriber or not, by testing the server association flag contained in the extracted record. If not such server association is present, the subscriber connection controller 15*a* invokes a normal call origination process which handles a call request from ordinary subscribers (Step P25).

If the server association flag indicates the presence of an associated server, the subscriber connection controller 15*a* recognizes the call origination request as being derived from that server, and activates the Internet connection controller 15*c*. Here, the Internet connection controller 15*c* has received from the subscriber connection controller 15*a* the subscriber line interface point identified above. Using this information as an index value, the Internet connection controller 15*c* retrieves a relevant record from the subscriber data file 15*e*, and further extracts a server ID number and a port ID number from the retrieved record (Step P26). The extracted server ID number must be the identifier of the server 35, and the extracted port ID number must be the port ID number of a subscriber line (H3) that has been used by the server 35 to transmit the call origination request being processed.

With the server ID number obtained in step P26, the Internet connection controller 15*c* retrieves a record pertaining to the server 35 from the server management data file 15*h*, and it extracts an IP address from the retrieved record (Step P27). The Internet connection controller 15*c* then activates the TCP/IP protocol controller 15*d* to send a request message to the server 35, indicating that the caller's phone number is needed (Step P28).

Being activated by the Internet connection controller 15*c*, the TCP/IP protocol controller 15*d* tries to find a vacant transmission port to make access to a control channel (H1), searching the access line control data file 15*i* (Step P29). More specifically, recall that the local switch 36 may have a plurality of control channels (H1). If this is the case, the TCP/IP protocol controller 15*d* opens the access line control data file 15*i* and detects an unused control channel (H1) by searching through the contents of each record's "port availability flag" field. If there is a record indicating the vacancy of a control channel, the TCP/IP protocol controller 15*d* extracts the corresponding transmission port ID number from that record.

The TCP/IP protocol controller 15*d* updates a relevant transmission channel usage record in the server management data file 15*h* (Step P30). More specifically, the TCP/IP protocol controller 15*d* retrieves a record relevant to the server 35 from the server management data file 15*h*, and increments the value of its transmission channel usage record field by one.

Through the transmission port and the control channel (H1) determined in step P29, the TCP/IP protocol controller 15*d* makes access to the server 35 by using the IP address that has been obtained in step P27. The TCP/IP protocol controller 15*d* transmits an information request message that demands the server 35 to provide the local switch 36 with the caller's phone number information (Step S6). Here, the TCP/IP protocol controller 15d annexes the port ID number extracted in step P26 to the information request message.

In response to this information request message, the server 35 extracts a phone number on the basis of the port ID number annexed to the message (Step P31). Because this port ID number must be equal to the port ID number of the subscriber line (H3) that was used by the server 35 to transmit a call origination request to the local switch 36 in step S5, the server 35 can use it as a keyword to identify a specific call reception request that was received from the server 33 and caused the call origination request in step S5. Now that the original call reception request is at hand, the server 35 can extract the caller's phone number from the request. The server 35 transmits the extracted phone number information to the local switch 36 (Step P32 and S7).

Upon receipt of the caller's phone number, the local switch 36 first activates its TCP/IP protocol controller 15d, which updates a reception channel usage record maintained in the server management data file 15h (Step P33). More specifically, the TCP/IP protocol controller 15d retrieves a record pertaining to the server 35 from the server management data file 15h, and increments the value of its "reception channel usage record" field by one.

The local switch 36 then activates the Internet connection controller 15c to save the caller's phone number into an appropriate entry of the call control data file 15g (Step P34). Which entry to use is determined by the subscriber line interface point that is identified by the local switch 36 on the basis of the subscriber line (H3) through which it received a call origination request in step S5.

The local switch 36 then activates the subscriber connection controller 15a to deliver the call to the telephone terminal 37 (Steps P35 and S8). Here, the callee's phone number specified in the call origination request of step S5 is used to call up the telephone terminal 37.

In this way, the caller's phone number is delivered to the callee-side local switch 36 and stored into the call control data file 15g. This phone number information can be reused, if required, in various service features on the callee's side. Such service features include a caller ID service which allows a called subscriber to see a caller's phone number on his/her telephone terminal. Another example may be such a service that tracks and locates a malicious calling party that is threatening a specific subscriber.

Referring back to FIG. 2, the illustrated system has only one control channel (H1) 23 to connect between the local switch 15 and the server 21. In this case, the other servers 19 and 20 cannot reach the local switch 15 to transmit or receive caller's phone number information, unless they go through the Internet 22 and the server 21. This means, when those servers are owned by different ISPs, that the servers 19 and 20 use the control channel (H1) 23 on a rental basis. The server management data file 15h of FIG. 5(A) maintains the records as to how many times each server has used the common control channel (H1) 23. Based on this server management data file 15h, the Internet service provider who owns the server 21 will charge the other providers, or the owners of other servers 19 and 20, for their use of the control channel (H1) 23.

In the Internet telephony system of the present invention, it is easy to implement such a service feature that allows the called party to inform the caller-side server or local switch of the caller's phone number. This service feature will help those who are in trouble with malicious callers. With the phone number informed from such a subscriber being in trouble, the caller-side server or local switch would disconnect the unwelcome calls, or would request police protection, for example, by informing of the caller's phone number.

The above discussion is summarized as follows. According to the present invention, the system is configured to permit a caller's phone number to be delivered to a callee-side local switch. The phone number information, which has originated at a caller-side local switch, first goes to a caller-side server, then travels across the Internet to reach a callee-side server, and finally arrives at the callee-side local switch.

In this way, the caller's phone number is delivered to the called party via the Internet. The present invention thus introduces an additional feature to an Internet telephony system, including what is known as caller ID services.

In the present invention, each local switch has a dedicated control channel to reach local ISP servers. This control channel, however, is not necessarily deployed for each individual server, but can be shared by a plurality of servers. This means, when the servers are owned by different providers, that one provider's server can use another provider's control channel on a rental basis. Since the usage records of such a control channel are maintained in the local switch, the owner of the channel can easily charge the other providers for their use of the channel.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A system for transmitting a caller's phone number from a caller side to a callee side when a call is made in an Internet telephony system, comprising:

a caller-side local switch which is linked to a caller;

a caller-side Internet service provider (ISP) server which is linked to said caller-side local switch;

a callee-side local switch which is linked to a callee;

a callee-side ISP server which is linked to said callee-side local switch;

Internet which links between said caller-side ISP server and said callee-side ISP server;

a first control channel which links between said caller-side ISP server and said caller-side local switch;

a second control channel which links between said callee-side ISP server and said callee-side local switch;

first transmission means, disposed in said caller-side local switch, for transmitting the caller's phone number to said caller-side ISP server through said first control channel;

second transmission means, disposed in said caller-side ISP server, for receiving the caller's phone number from said first transmission means and for transmitting the received caller's phone number to said callee-side ISP server over the Internet; and caller number acquisition means, disposed in said callee-side local switch, for acquiring the caller's phone number from said callee-side ISP server by using said second control channel.

2. The system according to claim 1, wherein said first and second control channels are dedicated transmission channels, disposed separately from subscriber lines, for delivering the caller's phone number.

3. The system according to claim 1, further comprising another ISP server disposed on the caller's side, which shares said first control channel link between said caller-side local switch and said caller-side ISP server.

4. The system according to claim 3, wherein said first transmission means transmits the caller's phone number to said another ISP server through a connection path which is formed by said first control channel, said caller-side ISP server, and the Internet.

5. The system according to claim 4, further comprising first recording means, disposed in said caller-side local switch, for recording the number of times that each of said caller-side ISP server and said another ISP server has used said first control channel.

6. The system according to claim 1, further comprising another ISP server disposed on the callee's side, which shares said second control channel link between said callee-side local switch and said callee-side ISP server.

7. The system according to claim 6, wherein said caller number acquisition means acquires the caller's phone number from said another ISP server through a connection path which is formed by said second control channel, said callee-side ISP server, and the Internet.

8. The system according to claim 7, further comprising second recording means, disposed in said callee-side local switch, for recording the number of times that each of said callee-side ISP server and said another ISP server has used said second control channel.

9. A system for transmitting a caller's phone number from a caller side to a callee side when a call is made in an Internet telephony system, comprising:
a caller-side local switch which is linked to a caller;
a caller-side Internet service provider (ISP) server which is linked to said caller-side local switch;
a callee-side local switch which is linked to a callee;
a callee-side ISP server which is linked to said callee-side local switch;
Internet which links between said caller-side ISP server and said callee-side ISP server;
a first control channel which links between said caller-side ISP server and said caller-side local switch;
a second control channel which links between said callee-side ISP server and said callee-side local switch;
caller number acquisition means, disposed in said caller-side ISP server, for acquiring the caller's phone number from said caller-side local switch by using said first control channel;
caller number transmission means, disposed in said caller-side ISP server, for transmitting the caller's phone number to said callee-side ISP server over the Internet; and
caller number informing means, disposed in said callee-side ISP server, for informing said callee-side local switch of the caller's phone number through said second control channel.

10. The system according to claim 9, wherein said first and second control channels are dedicated transmission channels, disposed separately from subscriber lines, for delivering the caller's phone number.

11. The system according to claim 9, further comprising another ISP server disposed on the caller's side, which shares said first control channel link between said caller-side local switch and said caller-side ISP server.

12. The system according to claim 11, wherein said another ISP server acquires the caller's phone number from said caller-side local switch through a connection path which is formed by the Internet, said caller-side ISP server, and said first control channel.

13. The system according to claim 12, further comprising first recording means, disposed in said caller-side local switch, for recording the number of times that each of said caller-side ISP server and said another ISP server has used said first control channel.

14. The system according to claim 9, further comprising another ISP server disposed on the callee's side, which shares said second control channel link between said callee-side local switch and said callee-side ISP server.

15. The system according to claim 14, wherein said another ISP server transmits the caller's phone number to said callee-side local switch through a connection path which is formed by the Internet, said caller-side ISP server, and said second control channel.

16. The system according to claim 15, further comprising second recording means, disposed in said callee-side local switch, for recording the number of times that each of said callee-side ISP server and said another ISP server has used said second control channel.

17. A system for transmitting a caller's phone number from a caller side to a callee side when a call is made in an Internet telephony system which is organized by a caller-side local switch, a caller-side Internet service provider (ISP) server, a caller-side ISP server, a callee-side local switch, and the Internet interconnecting the caller-side and callee-side ISP servers, comprising:
means, disposed in the caller-side ISP server, for sending the caller's phone number supplied from the caller-side local switch to the callee-side ISP server over the Internet; and
means, disposed in the callee-side ISP server, for sending the caller's phone number received from the caller-side ISP server to the callee-side local switch.

18. A method of transmitting a caller's phone number from a caller side to a callee side when a call is made in an Internet telephony system which is organized by a caller-side local switch, a caller-side Internet service provider (ISP) server, a callee-side ISP server, a callee-side local switch, and the Internet interconnecting the caller-side and callee-side ISP servers, the method comprising the steps of:
sending the caller's phone number supplied from the caller-side local switch, from the caller-side server to the callee-side ISP server over the Internet; and
sending the caller's phone number received from the caller-side ISP server, from the callee-side ISP server to the callee-side local switch.

19. A caller-side server disposed between a caller-side local switch and the Internet to serve a caller in an Internet telephony system, which transmits a caller's phone number when a call is made, comprising:
means for receiving a phone number of the caller from the caller-side local switch; and
means for sending the phone number over the Internet to a callee-side server which serves the called party.

20. A method of sending a caller's phone number in an Internet telephony system through a caller-side server which is disposed between a caller-side local switch and the Internet when a call is made, comprising the steps of:
receiving a phone number of the caller from the caller-side local switch; and
sending the phone number over the Internet to a callee-side server which serves the called party.

21. A callee-side server, disposed between a callee-side local switch and the Internet to serve a callee in an Internet telephony system, which transmit a caller's phone number when a call is made, comprising:
means for receiving a phone number of a caller from a caller-side server over the Internet; and
means for sending the received phone number to the callee-side local switch.

22. A method of sending a caller's phone number in an Internet telephony system through a callee-side server which is disposed between a callee-side local switch and the Internet when a call is made, comprising the steps of:
receiving the caller's phone number from the caller-side server over the Internet; and
sending the received caller's phone number to the callee-side local switch.

* * * * *